United States Patent
Miglio

(10) Patent No.: US 7,628,042 B2
(45) Date of Patent: Dec. 8, 2009

(54) DEVICE FOR COUPLING AND LOCKING THE DRUM SUPPORTING ARMS IN LINEN WASHING MACHINES AND THE LIKE

(75) Inventor: Emilio Bruto Miglio, Domaso (IT)

(73) Assignee: Miglio Emilio S.R.L., Domaso-Como (IT)

( * ) Notice: Subject to any disclaimer, the term of this patent is extended or adjusted under 35 U.S.C. 154(b) by 492 days.

(21) Appl. No.: 11/367,965

(22) Filed: Mar. 3, 2006

(65) Prior Publication Data
US 2006/0207298 A1    Sep. 21, 2006

(30) Foreign Application Priority Data
Mar. 17, 2005 (IT) .......................... MI05A000447

(51) Int. Cl.
*D06F 37/20* (2006.01)
(52) U.S. Cl. ........................................... 68/3 R
(58) Field of Classification Search .................. 68/3 R, 68/23.1, 23.2
See application file for complete search history.

(56) References Cited

U.S. PATENT DOCUMENTS

| | | | | |
|---|---|---|---|---|
| 2,268,088 A | * | 12/1941 | Scholtes | ...................... 29/507 |
| 5,335,522 A | * | 8/1994 | Stadelmann et al. | ......... 68/23.1 |
| 5,709,109 A | * | 1/1998 | Cho | ........................... 68/23.2 |
| 6,151,930 A | * | 11/2000 | Carlson | ..................... 68/12.06 |
| 6,574,997 B1 | * | 6/2003 | Mayer et al. | .................. 68/23.1 |
| 7,294,942 B2 | * | 11/2007 | Lee et al. | ...................... 310/43 |
| 7,373,793 B2 | * | 5/2008 | Choi, Kang Mo | ........... 68/23.1 |
| 2005/0183472 A1 | * | 8/2005 | Choi | ........................... 68/23.1 |
| 2007/0204659 A1 | * | 9/2007 | Yoon et al. | ................... 68/23.1 |

FOREIGN PATENT DOCUMENTS

WO    WO 9826197 A1 *  6/1998
WO    WO 2005085510 A1 *  9/2005

OTHER PUBLICATIONS

Electronic translation of WO 20050085510 A1.*

* cited by examiner

*Primary Examiner*—Joseph L Perrin
(74) *Attorney, Agent, or Firm*—James V. Costigan; Hedman & Costigan, P.C.

(57) ABSTRACT

A device for coupling and locking a drum supporting arm in a linen washing machine comprises a deformable metal tubular element to be engaged in a resilient bush element lining an end hole of the drum supporting arm, and a deforming punch element for deforming and locking the deformable metal tubular element in the resilient bush element.

3 Claims, 4 Drawing Sheets

DEVICE FOR COUPLING AND LOCKING THE DRUM SUPPORTING ARMS IN LINEN WASHING MACHINES AND THE LIKE

BACKGROUND OF THE INVENTION

The present invention relates to a coupling device and method for coupling and locking the drum supporting arms in linen washing machines and the like.

As is known, the drum or basket of linen washing machines is conventionally supported by supporting arms which are connected, at their end portions, respectively, to the washing machine drum and body.

To provide the connection, the supporting arms are provided, at their end portions, with respective resiliently yieldable material bush elements, for example made of rubber or the like, in which is engaged a first tubular element and, then, a second tubular element or inner rivet, allowing each end portion of an arm to be clamped to a respective bracket.

As it should be apparent, such a connection method is rather expensive, because of the high number of connection devices to be used.

SUMMARY OF THE INVENTION

Accordingly, the aim of the present invention is to overcome the above mentioned problem, by providing a coupling device and method for coupling the drum supporting arms in a linen washing machine and the like, allowing to reduce the component elements, while simplifying all the coupling elements.

Within the scope of the above mentioned aim, a main object of the invention is to provide such a coupling device and method adapted to provide an optimum locking of the components, while reducing their number, and consequently reducing their number, and consequently reducing the suspended weights, with a self-obvious advantage in operating the linen washing machine.

Another object of the invention is to provide such a coupling device and method which is very reliable and safe in operation.

Yet another object of the present invention is to provide such a coupling device, for coupling the drum supporting arms in a linen washing machine and the like, which can be easily made and which, moreover, is very competitive from a mere economic standpoint.

According to one aspect of the present invention, the above mentioned aim and objects, as well as yet other objects, which will become more apparent hereinafter, are achieved by a coupling device and method for coupling the drum supporting arms in a linen washing machine substantially as claimed.

BRIEF DESCRIPTION OF THE DRAWINGS

Further characteristics and advantages of the present invention will become more apparent hereinafter from the following detailed disclosure of a preferred, though not exclusive, embodiment of the coupling device and method for coupling the drum supporting arms in linen washing machines and the like, which is illustrated, by way of an indicative, but not limitative example, in the accompanying drawings, where.

DESCRIPTION OF THE PREFERRED EMBODIMENT

Figure 1:
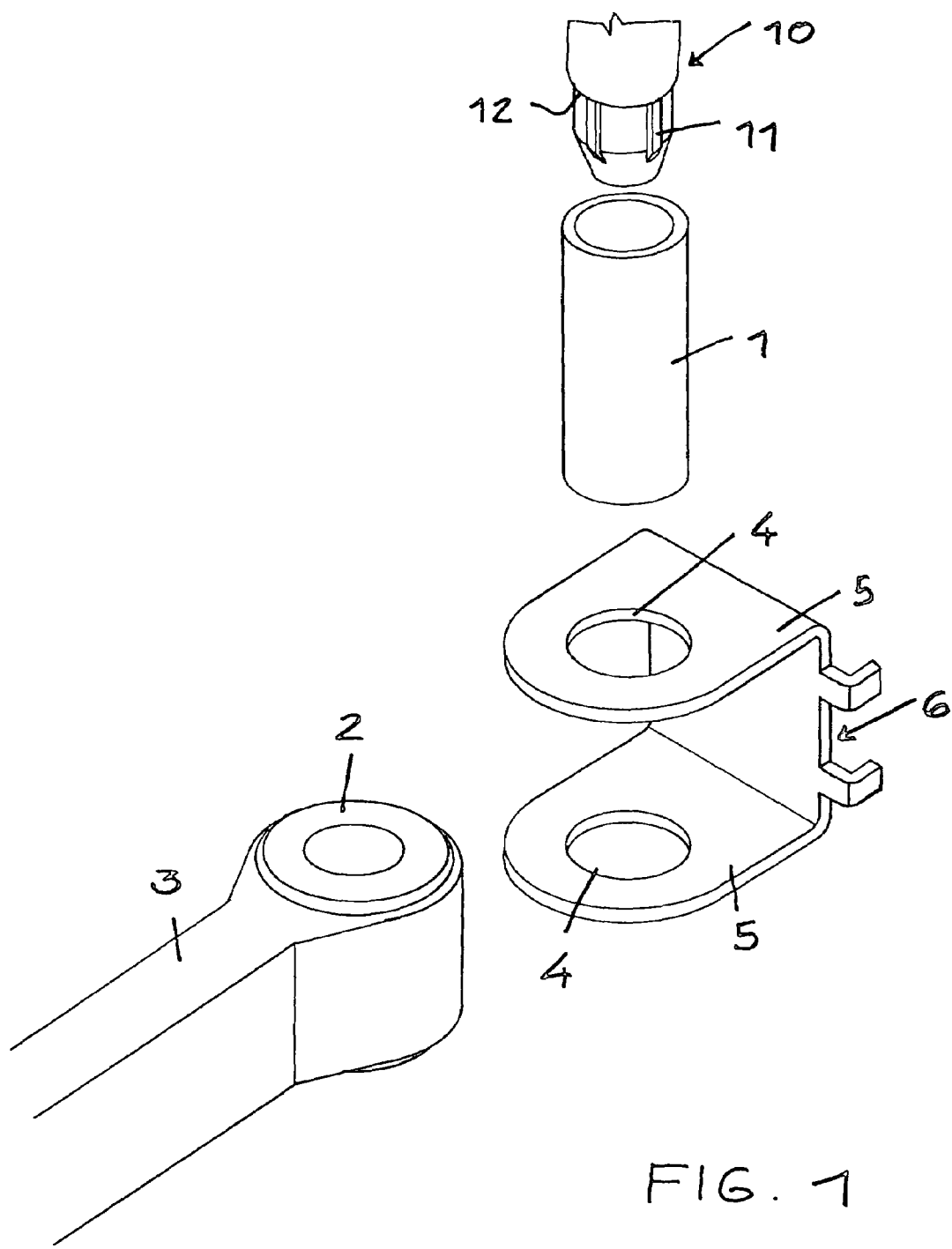
FIG. 1 is a schematic exploded perspective view illustrating the coupling device according to the present invention.
Figure 2:
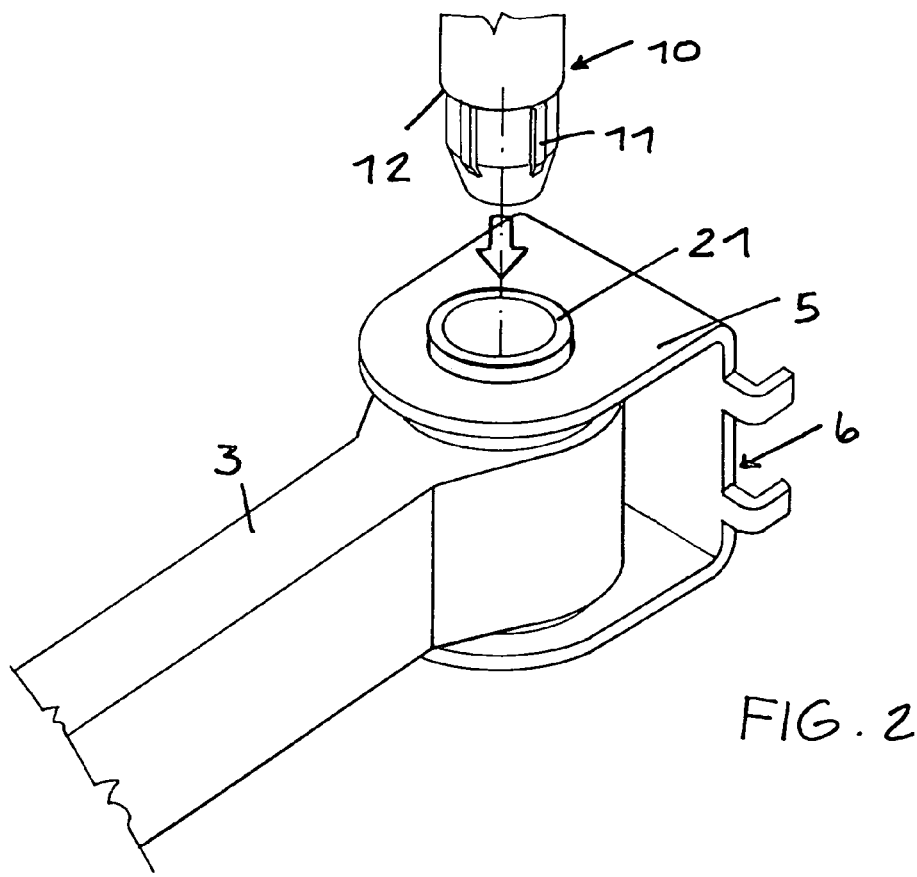
FIG. 2 shows the coupling device with a deforming punch element engaged in its tubular element for deforming said tubular element according to the operating step of the inventive method.
Figure 3:
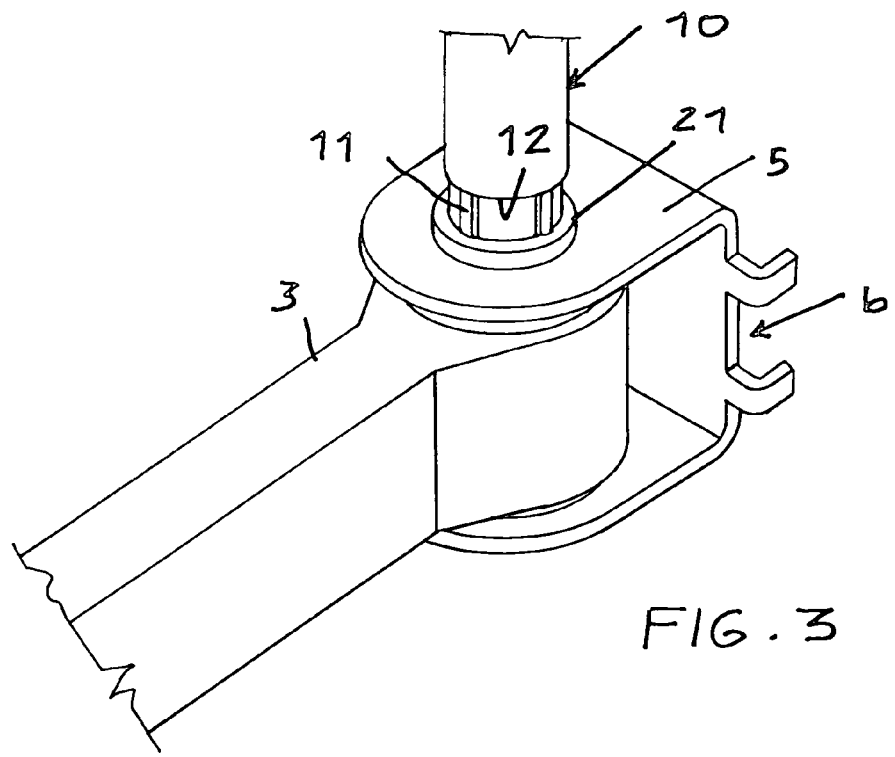
FIG. 3 schematically shows the punch element in an engaged or inserted condition thereof.
Figure 4:
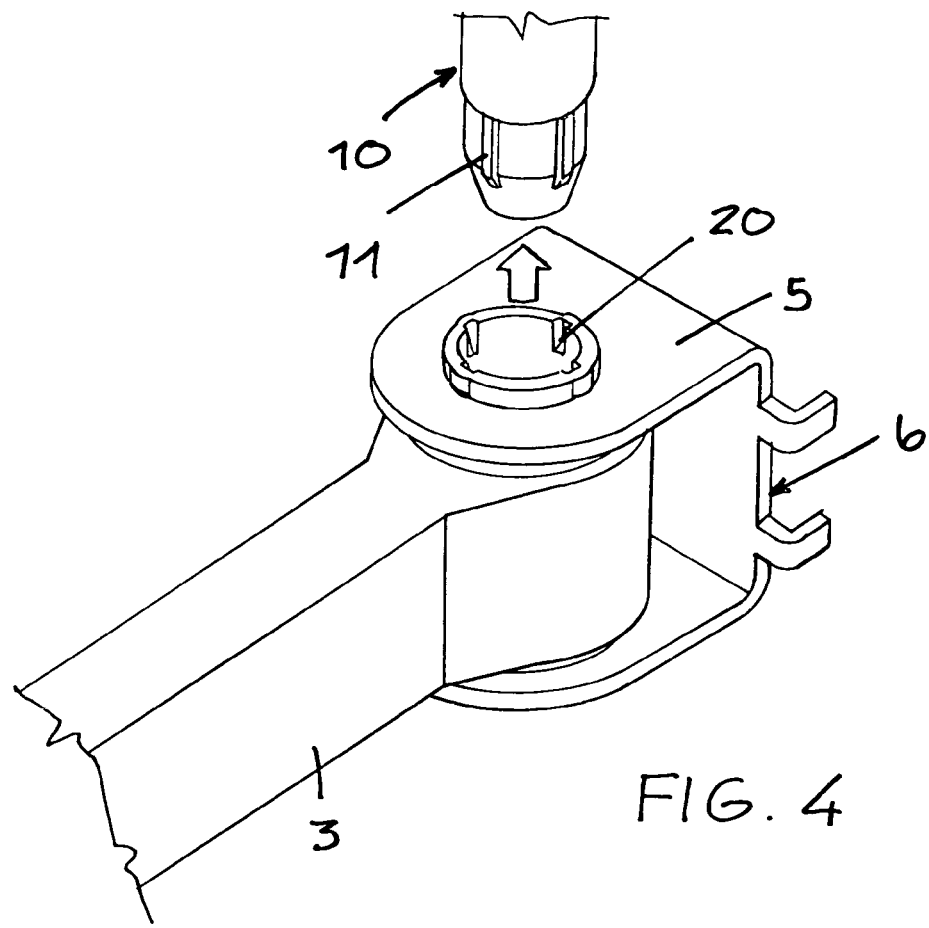
FIG. 4 shows a further operating step for withdrawing the punch element.
Figure 5:
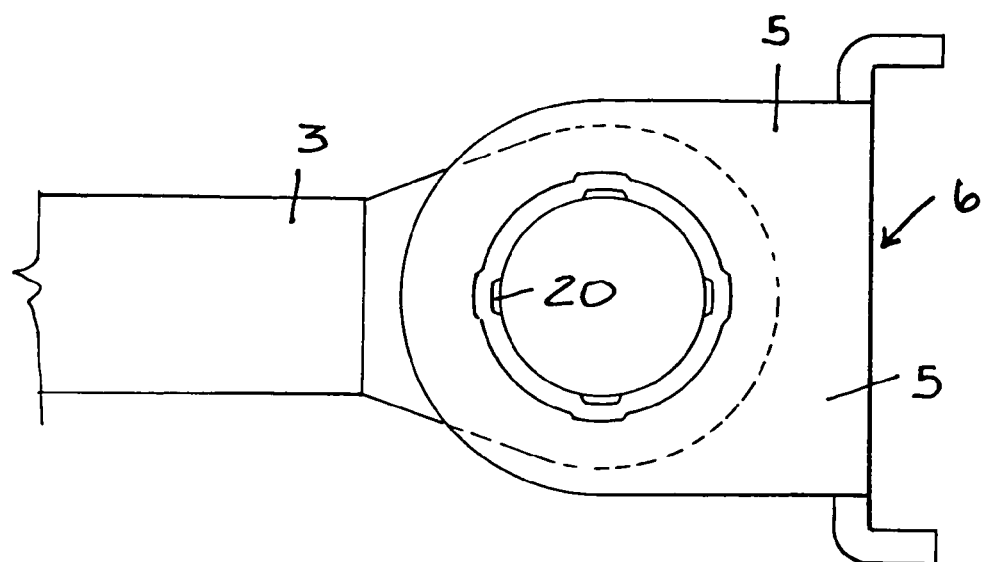
FIG. 5 is a top plan view of the coupling device, and clearly shows the upturned edge portion thereof clamping said device to the supporting bracket.

With reference to the number references of the above mentioned figures, the coupling device for coupling the drum supporting arms in a linen washing machine and the like, comprises a metal tubular element 1, having smooth outer and inner cylindrical surfaces, to be pressure engaged in each of the plurality of bush elements 2, made of a resilient material, and arranged at the end portions of a drum supporting arms 3.

Said cylindrical smooth tubular element 1 has such a diameter length and thickness as to be snugly engaged in respective opposite holes 4 formed through the arms or prongs 5 of a supporting U-bracket 6, designed for coupling the drum supporting arm 3 respectively to the washing machine drum or basket and to the body or framework of the washing machine (both not shown).

A main feature of the invention is that the coupling is performed by deforming both the outer and inner surfaces of the single deformable metal tubular element 1 at its end portions by a deforming substantially cylindrical contoured punch element 10, having bottom vertical ridges 11 radially projecting therefrom and circumferentially arranged at the bottom of the punch element and spaced from one another.

More specifically, said ridges 11 end with an end annular enlarged abutment 12, formed at the bottom of the punch element 10.

Thus, the engagement or introduction of the punch element 10 will radially deform, by vertical circumferentially spaced inner grooves 20 the deformable metal material of the inner smooth surface of the cylindrical tubular element, and, by outer vertical projections 21, substantially smooth surface of the tubular element to firmly lock the tubular element 1 in the bush element 2.

Figure 6:
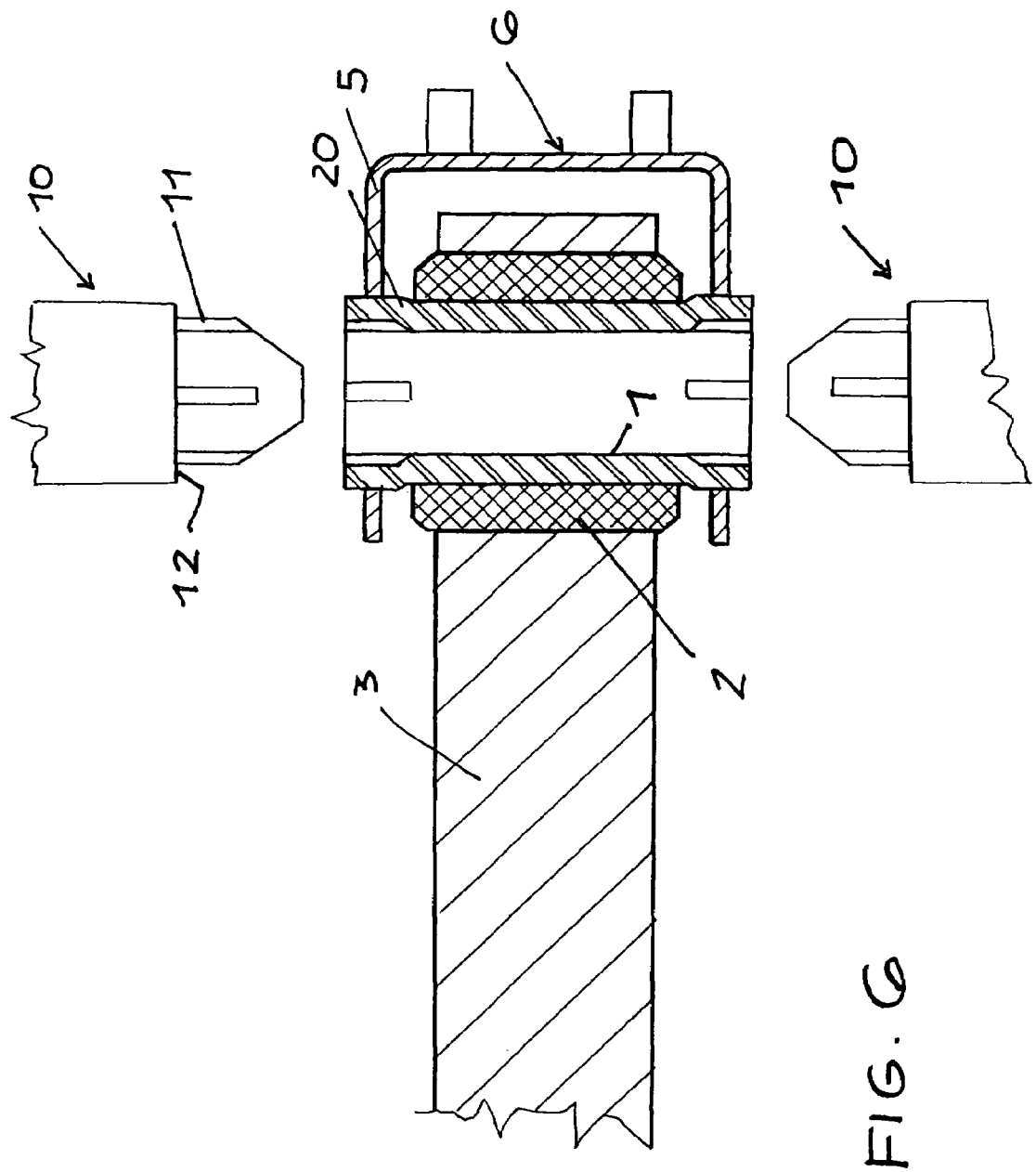
FIG. 6 is a cross sectional view showing the coupling device according to the invention firmly locking the drum supporting arm.

More specifically, said locking projections 21 extend either through the overall length of the metal tubular element or a portion thereof, depending on the punch insertion depth thereby properly clamping said now deformed tubular element in the bush element 2 and in the clamping bracket 5, as shown in FIG. 6, where the tubular element is shown deformed at both the inner and outer surfaces of the end portions thereof by a respective punch element 10.

Thus, from the above disclosure it should be clear that the invention further discloses a method for coupling and locking a drum supporting arm to a U-bracket in a linear washing machine, said arm having an end throughgoing hole lined by a resilient bush element, said U-bracket having opposite U-bracket prongs, each said bracket prong including a throughgoing hole, wherein said method comprises the steps of arranging said bush element of said arm between said holes of said U-bracket prongs, engaging a cylindric smooth deformable metal element, having a first end portion and a second end portion through said U-bracket prong holes and through said bush element and engaging in and pressing a deforming contoured punch element through said first end portion and second end portion of said deformable metal element so as to deform said first and second end portions thereof, thereby locking said drum supporting arm to said U-bracket prongs.

From the above disclosure it should be apparent that the invention fully achieves the intended aim and objects.

In fact, the invention provides very stable and efficient clamping, with a great economic saving, since a single tubular element is used therein.

The invention, as disclosed, is susceptible to several modifications and variations, all of which will come within the scope of the invention.

The invention claimed is:

1. A device coupling and locking a drum supporting arm to a U-bracket in a linen washing machine, said drum supporting arm having an end supporting arm throughgoing hole and said U-bracket having opposite U-bracket prongs, each said U-bracket prong including a U-bracket prong throughgoing hole, wherein said device comprises a resilient bush element engaged in said end supporting arm throughgoing hole of said drum supporting arm between said throughgoing holes of said U-bracket prongs, a tubular smooth deformable metal element, having a first end portion and a second end portion and engageable through said U-bracket prong throughgoing holes and through said resilient bush element and a deforming punch element, said deforming punch element having a plurality of bottom vertically radially extending circumferentially spaced deforming ridges, thereby as said punch element is pressed through said first and second end portions of said tubular smooth deformable metal element, an inner and an outer surface of said first and second end portions are so deformed to form inner circumferentially spaced vertical grooves and corresponding outer circumferentially spaced outer projections as to lock said drum supporting arm to said U-bracket prongs.

2. A device according to claim 1, wherein said inner grooves and cuter projections vertically extend through at least a length of said inner and outer surfaces of said end portions of said tubular smooth deformable metal element.

3. A device according to claim 1, wherein said circumferentially projecting ridges are delimited, at a top end portion thereof, by an annular enlarged abutment bottom portion of said punch element.

\* \* \* \* \*